United States Patent [19]

Yoshioka et al.

[11] Patent Number: 4,750,458
[45] Date of Patent: Jun. 14, 1988

[54] INTAKE SYSTEM FOR ROTARY PISTON ENGINE

[75] Inventors: Sadashichi Yoshioka; Siso Kariyama; Akihito Nagao, all of Hiroshima, Japan

[73] Assignee: Mazda Motor Corporation, Hiroshima, Japan

[21] Appl. No.: 946,011

[22] Filed: Dec. 24, 1986

[30] Foreign Application Priority Data

Dec. 27, 1985 [JP] Japan .................. 60-294603

[51] Int. Cl.$^4$ ............................. F02B 53/06
[52] U.S. Cl. .................................... 123/242
[58] Field of Search ............ 123/216, 242, 316; 418/60

[56] References Cited

U.S. PATENT DOCUMENTS

| 3,528,084 | 9/1970 | Hohenlohe | 123/242 |
| 3,762,376 | 10/1973 | Eberle et al. | 123/8.01 |
| 3,919,986 | 11/1975 | Goto | 123/75 E |
| 4,116,190 | 9/1978 | Kikura et al. | 123/242 X |
| 4,128,085 | 12/1978 | Kunii | 123/75 E |

FOREIGN PATENT DOCUMENTS

| 1576196 | 4/1970 | Fed. Rep. of Germany | 123/216 |
| 2161798 | 6/1973 | Fed. Rep. of Germany | 123/242 |
| 122315 | 7/1983 | Japan | 123/316 |
| 172429 | 10/1983 | Japan | 123/242 |
| 2144489 | 3/1985 | United Kingdom | 123/242 |

Primary Examiner—Michael Koczo
Attorney, Agent, or Firm—Fleit, Jacobson, Cohn & Price

[57] ABSTRACT

An intake system for a rotary piston engine having a plurality of engine sections, each engine section being separated by an intermediate housing. In the intake system, there are provided communicating passages for communicating the engine sections so that intake air can be transferred between working chambers formed in the engine sections in accordance with a difference in rotor phase between the engine sections. The communicating passage is located so as to be closed after an intake port is closed in each engine section and positioned so that there remains a larger amount of intake air in each of the working chambers than the minimum amount of intake air required for ensuring idling rotation speed under idling engine operating condition when the communicating passage is closed. This intake system makes it possible to obtain a rotary piston engine which can remarkably reduce pumping loss and desirably control the amount of intake air in accordance with an engine operating condition.

12 Claims, 5 Drawing Sheets

INTAKE SYSTEM FOR ROTARY PISTON ENGINE

BACKGROUND OF THE INVENTION

The present invention relates to an intake system for a rotary piston engine, and more particularly to such an intake system capable of reducing pumping loss.

DESCRIPTION OF PRIOR ART

It is well known that since the Otto cycle engine is usually operated at an initial stage of compression stroke under a condition where the pressure within the combustion chamber is lower than the atmospheric pressure, a so-called pumping loss cannot be avoided. It is considered that the pumping loss amounts to about 30% of the total energy loss caused by the operation of the engine. Therefore, the thermal efficiency of the engine can be remarkably improved if the pumping loss can be reduced.

In order to reduce the pumping loss, there have been proposed a method in which an intake valve means is closed earlier or later than the standard timing, and a method in which a part of the intake air is recirculated to the intake system.

Unexamined Japanese Patent Publication No. 172429/1983 discloses an intake system for a rotary piston engine constituted so as to reduce the pumping loss in accordance with the latter method in which working chambers of two engine sections are connected by a communicating passage so as to be communicated with each other at a predetermined timing and in which a control valve, its opening being controlled in accordance with the engine load, is provided within the communicating passage.

However, in the prior art methods, since the timing of closing the intake valve or the timing of closing and opening the control valve has to be controlled in accordance with the engine load and the engine r.p.m., it is difficult to constitute the hardware of the controlling system and complicated software programs are necessary. As a result, the intake system based upon the prior art method has not been put into practice yet.

SUMMARY OF THE INVENTION

It is therefore an object of the present invention to provide an intake system for rotary piston engines which can reduce the pumping loss with simple hardware and software.

According to the present invention, the above and other objects can be accomplished by an intake system for a rotary piston engine having a plurality of engine sections each having a rotor therein in each of which a working chamber is formed, each of said engine sections being separated by an intermediate housing and having at least one intake port for introducing intake air into each of said working chambers, each of said intake ports communicating with an intake passage means, comprising communicating passage means for communicating said engine sections so that intake air can be transferred between said engine sections in accordance with the rotor phase difference between the engine sections, said communicating passage means being controlled so as to be closed at a timing after the intake port is closed in each engine section and positioned so that there remains a larger amount of intake air in each of the working chambers than the required amount of intake air under the lowest load driving condition when the communicating passage means is closed, and throttle valve means for controlling the amount of intake air, said throttle valve means being located in said intake passage means.

The above and other objects and features of the present invention will become apparent from the following descriptions taking reference to the accompanying drawings.

DESCRIPTION OF THE PREFERRED EMBODIMENT

Figure 1:
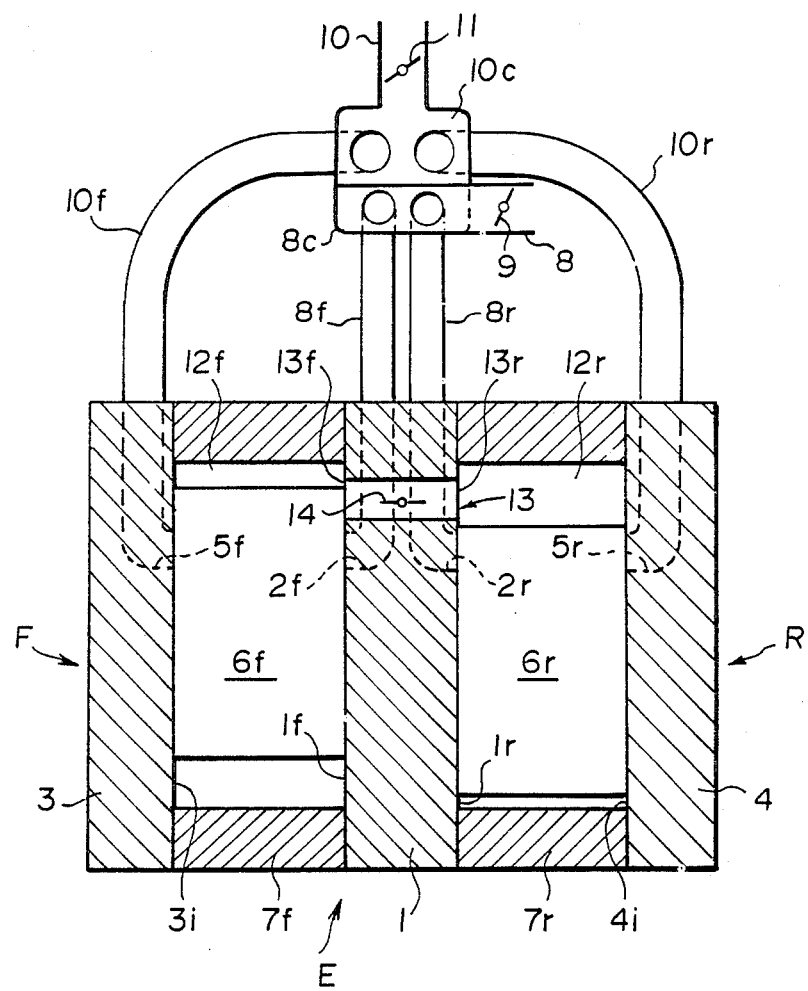
FIG. 1 is a schematic drawing showing a longitudinal cross-sectional view of a rotary piston engine having an intake system which is an embodiment of the present invention.

Referring to FIG. 1, there is shown a two-rotor type rotary piston engine E consisting of a front engine section F and a rear engine section R. The engine sections F and R respectively have rotor housings $7f$ and $7r$ which are formed with inner walls of trochoidal configuration. An intermediate housing 1 is located between the rotor housings $7f$ and $7r$ to separate them one from the other. The outer sides of the rotor housings $7f$ and $7r$ are attached with side housings 3 and 4 the inner walls $3i$ and $4i$ of which are formed with second intake ports $5f$ and $5r$. Thus, the rotor housing $7f$ and $7r$, the side housing 3 and 4, and the intermediate housing 1 constitute a casing in which a pair of rotor cavities are defined. On the opposite faces of the intermediate housing 1, there are formed first intake ports $2f$ and $2r$ opening to respective rotor cavities. The respective second intake ports $5f$ and $5r$ are located at positions opposite the respective first intake ports.

As well known in the art, in each of the rotor cavities, there is disposed a rotor $6f$ or $6r$ of substantially triangular configuration which is rotatable with apex portions in sliding contact with the inner wall of the rotor housing $7f$ or $7r$. Thus, in each of the rotor cavities in the casing, there are defined working chambers $12f$ and $12r$ whose volumes cyclically change as the rotor $6f$ or $6r$ rotates.

Each of the second intake ports 5f and 5r is located slightly toward the leading side of the first intake port with respect to the rotating direction of the rotor 6f or 6r. The two rotors 6f and 6r have 180 degree phase difference in terms of eccentric shaft rotation angle.

Each of the first intake ports 2f and 2r is communicated with a first ramiform intake passage 8f or 8r ramified from a junction portion 8c of a first intake passage 8 and there is provided within the first intake passage 8 upstream of the junction portion 8c a first throttle valve 9 the opening of which is controlled in accordance with the engine load.

Similarly, each of the second intake ports 5f and 5r is communicated with a second ramiform intake passage 10f or 10r ramified from a junction portion 10c of a second intake passage 10 and there is provided within the second intake passage 10 upstream of the junction portion 10c a second throttle valve 11 controlled so that it is opened when the opening degree of the first throttle valve 9 is larger than a predetermined value.

As shown in FIG. 1, there is provided in the intermediate housing 1 a communicating passage 13 communicating the working chambers 12f and 12r of the engine section F and R and a control valve 14 is provided within the communicating passage 13.

Figure 2:
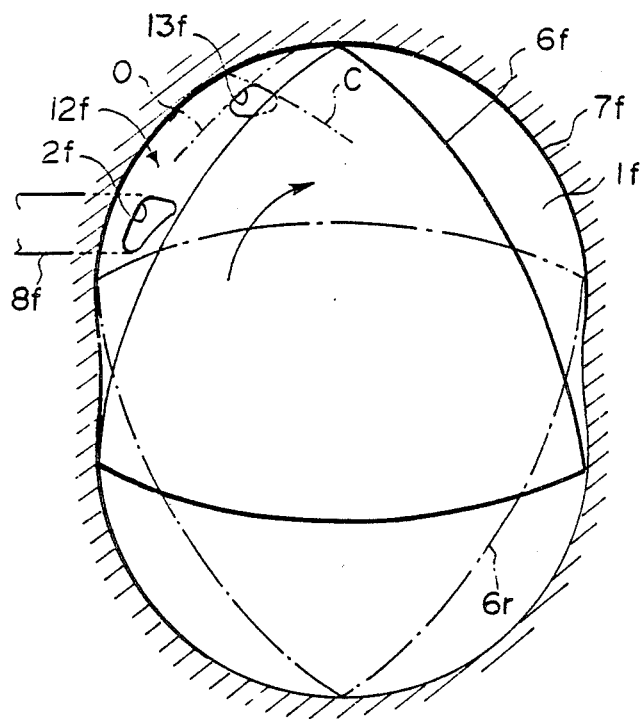
FIG. 2 is a schematic drawing showing a longitudinal cross-sectional view of a front engine section of the rotary piston engine having an intake system which is the embodiment of the present invention.

As shown in FIG. 2 in connection with the front engine section F, said communicating passage 13 is arranged so that the front side opening 13f thereof is located at the leading side of both the first intake port 2f and the second intake port 5f with respect to the rotating direction of the rotor 6f. The edge of the front side opening 13f of the communicating passage 13 is positioned so that the opening 13f begins to be opened at the rotor phase as shown by a phantom line O and is closed at the rotor phase as shown by a phantom line C. The rotor 6r is shown by a phantom line in FIG. 2.

Figure 3:
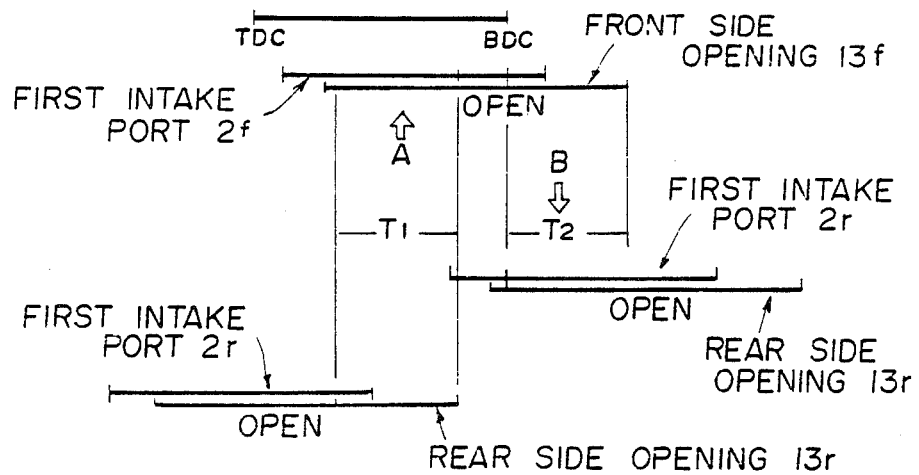
FIG. 3 is a time chart showing timings of opening and closing intake ports and a communicating passage in the embodiment of the present invention.

The operation mode of the communicating passage 13 will be hereinafter described in more detail based upon the time chart shown in FIG. 3.

The first intake port 2f and the second intake port 5f of the front rotor housing 7f begin to be opened with a slight time delay after the front rotor 6f passes through the top dead center TDC, for example, when the rotor 6f is rotated 32 degrees after TDC, and afterward the front side opening 13f of the communicating passage 13 begins to be opened with a further slight time delay, for example, when the rotor 6f is rotated 75 degrees after TDC. (See the phantom line O in FIG. 2.)

On the other hand, the first intake port 2r and the second intake port 5r of the rear rotor housing 7r are still opened when the first intake port 2f and the second intake port 5f of the front rotor housing 7f begin to be opened and when the front side opening 13f of the communicating passage 13 begins to be opened, and they are shut some time after the front side opening 13f of the communicating passage 13 is opened. The rear side opening 13r of the communicating passage 13 is shut with a slight time delay after the first intake port 2r and the second intake port 5r of the rear rotor housing 7r is closed. Consequently, the communicating passage 13 is communicated with both the front and rear working chamber 12f and 12r for a time period T1 between the time when the front side opening 13f of the communicating passage 13 begins to be opened and the time when the rear side opening 13r thereof is closed.

The working chamber 12r in the rear engine section R takes a position between the final stage of the intake stroke and the initial stage of the compression stroke in the time period T1 and the pressure therein is higher than that in the working chamber 12f in the front engine section F which takes a position at the first half stage of the intake stroke. As a result, the mixture of intake air and fuel flows from the working chamber 12r in the rear engine section R into the working chamber 12f in the front engine section F through the communicating passage 13 as shown by arrow A. Therefore, during the time period T1, the mixture is drawn through the communicating passage 13 into the working chamber 12f taking a position at the first half stage of the intake stroke and the pressure in the working chamber 12r is prevented from being undesirably increased.

Then, the first intake port 2r and the second intake port 5r of the rear rotor housing 7r begin to be opened again just before the rear side opening 13r of the communicating passage 13 is closed and afterward the rear side opening 13r is opened. On the other hand, after the working chamber 12f passes through the bottom dead center BDC (when the crank angle is, for example, 40 degree from BDC), the first intake port 2f and the second intake port 5f of the front rotor housing 7f are closed and the front side opening 13f is closed with a predetermined time delay when the crank angle is, for example, 135 degree from BDC.

Both the front side opening 13f and the rear side opening 13r of the communicating passage 13 are opened during the time period T2 (T2=T1) after BDC up to the time the front side opening 13f is closed. During this time period T2, the mixture flows from the working chamber 12f of the front engine section F into the working chamber 12r of the rear rotor housing 7r as shown by arrow B. As a result, increase in the pressure in the working chamber 12f of the front engine section F is prevented and the mixture is drawn into the working chamber 12r of the rear engine section R.

After the front side opening 13f of the communicating passage 13 is closed, the compression stroke starts in the front engine section F. When the front side opening 13f of the communicating passage 13 is closed, the inner volume of the working chamber 12f is set so as to be larger than the intake air volume required under idling condition where the throttle valve 9 is fully opened, in other words, the volume of the minimum required amount of intake air. More specifically, the edge of the opening 13f is positioned at the trailing side of an imaginary position thereof with respect to the rotating direction of the rotor 6f, said imaginary position being determined so that when the front side opening 13f is closed, the volume of the working chamber 12f equals that of the minimum required amount of intake air.

The operation mode of the control valve 14 and the throttle valve 9 and 11 will be hereinafter described.

Figure 4:
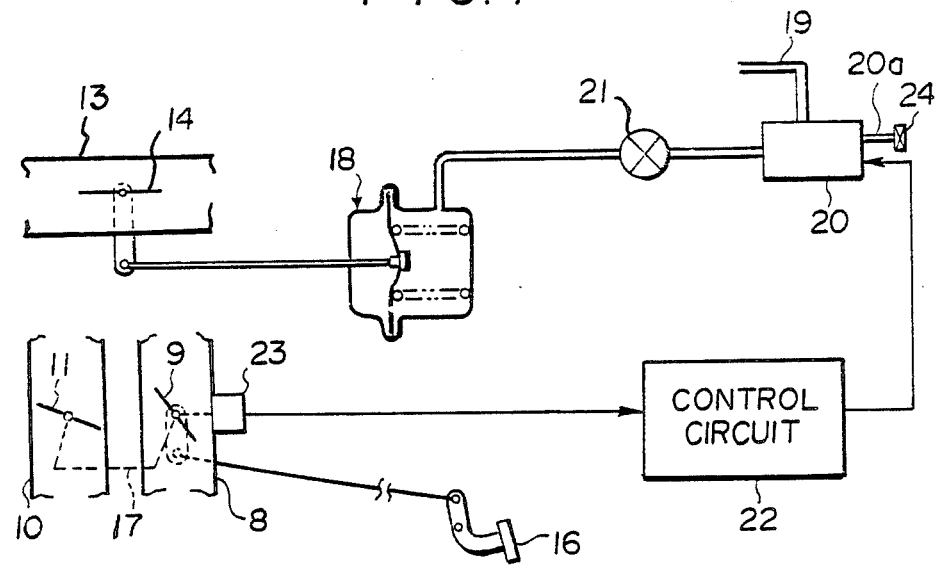
FIG. 4 is a schematic drawing showing a control system for throttle valves and a control valve in the embodiment of the present invention.

Referring to FIG. 4, the opening of first throttle valve 9 is controlled by an accelerator pedal 16 and the second throttle valve 11 is interlocked with the first throttle valve 9 by a link 17. The control valve 14 is actuated by an actuator 18 consisting of a diaphragm. A pressure transmitting passage 19 for transmitting the negative pressure of intake air from a downstream portion of the first throttle valve 9 in the first intake passage 8 to the actuator 18 is provided and a three-way solenoid valve 20 and a delay valve 21 are provided within the pressure transmitting passage 19. The three-way solenoid valve 20 is controlled by a control circuit 22.

This control circuit 22 controls the three-way solenoid valve based upon a signal representing the opening of the first throttle valve 9 detected by a throttle opening sensor 23 as follows:

When an ON signal is input to the three-way solenoid valve 20, the three-way solenoid valve 20 is driven so that the pressure transmitting passage 19 is communicated with the actuator 18 and when an OFF signal is input, it operates so that the communication between the pressure transmitting passage 19 and the actuator 18 is cut off and that an atmospheric port 20a is communicated with the the actuator 18 to apply the atmospheric pressure onto the actuator 18 through a filter means 24.

The actuator actuates so that when the negative pressure is applied from the pressure transmitting passage 19 thereto, the control valve 14 is fully opened as shown in FIG. 4 and that when atmospheric pressure is applied thereto, the control valve is closed. The delay valve 21 provided between the actuator 18 and the three-way solenoid valve 20 delays said switching operation of the control valve 14 to prevent the driving condition from suddenly changing.

Figure 5:
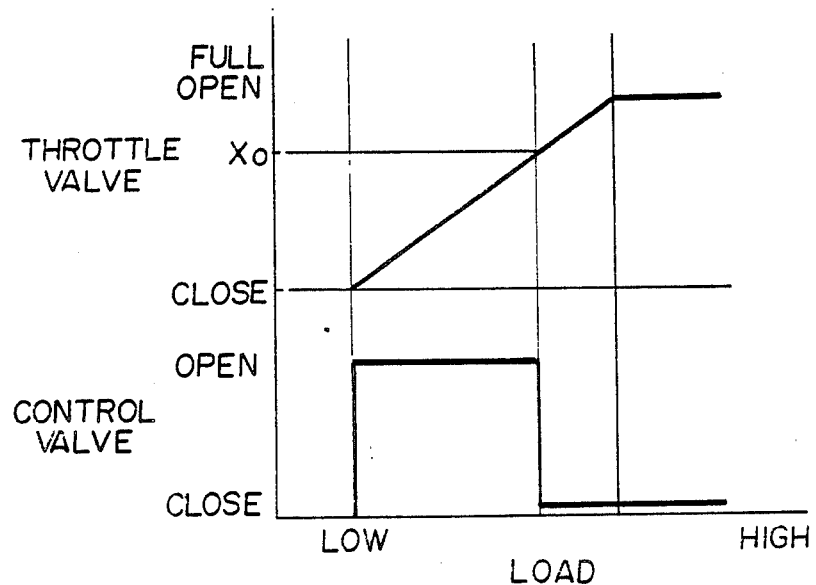
FIG. 5 is a graph showing a method for controlling the opening of the first throttle valve and the control valve in the embodiment of the present invention.

As shown in FIG. 5, the control valve 14 is fully opened under the low load driving condition where the opening of the first throttle valve 9 is not larger than the predetermined opening value XO and it is closed under the condition where the opening of the first throttle valve 9 exceeds the predetermined opening value XO.

Referring to FIG. 4, when the control circuit 22 detects that the opening of the first throttle valve 9 has reached the predetermined opening value XO, it changes the signal to be input to the three-way solenoid valve 20 from ON to OFF and cuts off the negative pressure of intake air to shut the control valve 14. However, the control valve 14 may be closed under the idling condition.

The predetermined opening value XO is determined based upon the output characteristics of the engine. More specifically, the predetermined opening value XO is experimentality determined as follows:

The opening of the first throttle valve 9 is increased under the condition where the front engine section F and the rear engine section R are communicated with each other by the communicating passage 13 and a critical opening value at the time when the output of engine cannot be increased any more is set as the predetermined opening value XO. When the opening of the first throttle valve 9 exceeds said predetermined opening value XO, the control valve 14 is shut primarily in order to ensure the engine a sufficient amount of intake air.

Figure 6:
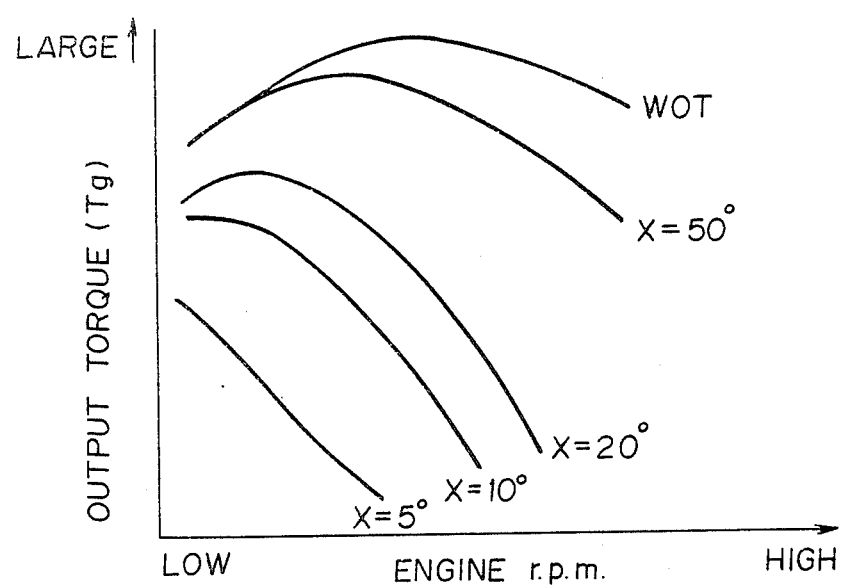
FIG. 6 is a graph showing the relationship between the engine r.p.m. and the engine output torque characteristics as a function of the opening of the first throttle valve in the embodiment of the present invention.

The relationship between the engine r.p.m. and the engine output torque characteristics in the above intake system is shown in FIG. 6 as a function of the opening value X of the first throttle valve 9. In the intake system of this embodiment, the opening value X of the first throttle valve 9 is set slightly larger than that in the prior art system in which the communicating passage is not provided and the engine is operated under a lower intake pressure. Thus, the pumping losses under low load driving condition can be remarkably reduced while, nevertheless, the intake system can be controlled in a similar manner to that in the prior art system.

In this embodiment, since there are formed the first intake ports 2f and 2r on the opposite faces of the intermediate housing 1 and there are formed the second intake ports 5f and 5r on the inner walls 3i and 4i of the side housings 3 and 4, each facing the intermediate housing 1, the mixture flowing into the working chamber 12f or 12r from the other 12r or 12f is prevented from directly entering into the first ramiform intake passage 8f or 8r during the period that the communicating passage 13 communicates the working chambers 12f and 12r with each other under the low load driving condition. On the other hand, since the second intake ports 5f and 5r are closed under the low load driving condition, they can be located so as to face the front side and rear side opening 13f and 13r of the communicating passage 13 and that is advantageous from the point of the layout of respective means.

Figure 7:
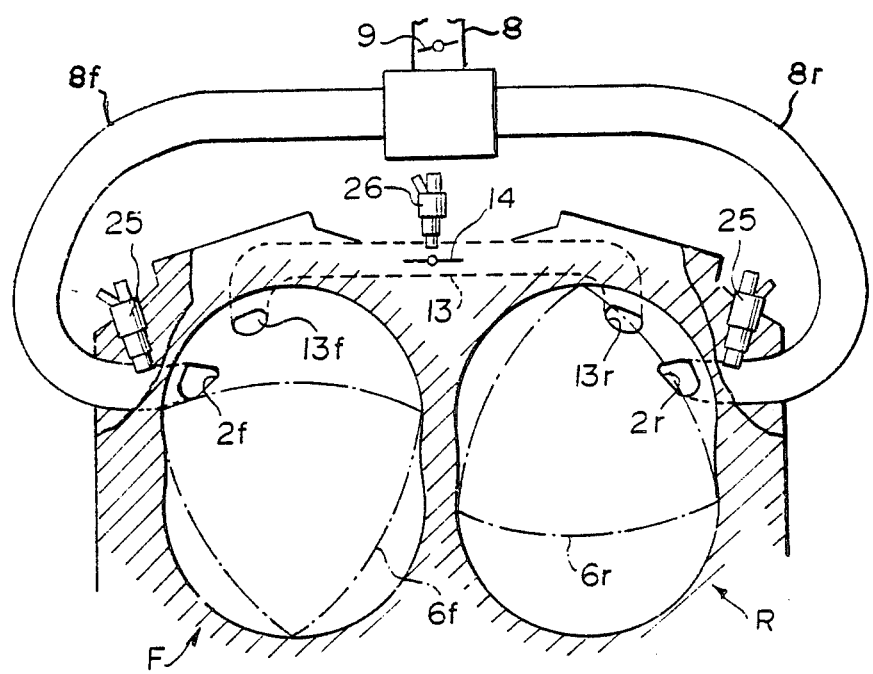
FIG. 7 is a schematic drawing showing alongitudinal cross-sectional view of the rotary piston engine having an intake system which is an embodiment of the present invention and further including a fuel feeding system.

FIG. 7 shows an engine including an intake system which is an embodiment of the present invention and further a fuel feeding system.

Fuel injection nozzles 25 are usually provided for each of the first intake ports 2f and 2r to feed required fuel over the whole range of driving conditions, but, in this embodiment, a third fuel injection nozzle 26 is provided in the vicinity of the center portion of the communicating passage 13 to feed fuel into the communicating passage 13 during the time that the control valve 14 is opened. In other words, the opening of the first throttle valve 9 is not larger than the predetermined opening valve XO. Therefore, during this period, the third fuel injection nozzle 26 feeds fuel in place of the fuel injection nozzles 25 provided for the first intake ports 2f and 2r. In this embodiment, since the flow rate of the mixture gas of fuel and intake air within the communicating passage 13 is larger than that at the first intake ports 2f and 2r under the low load condition where the control valve 14 is opened, it is possible to improve the vaporization and atomization of fuel by injecting fuel into the communicating passage 13 at the timing when the communicating passage 13 communicates the front rotor housing 7f and the rear rotor housing 7r. Further, since the fuel injection nozzle 26 is provided nearer to an ignition plug (not shown) than the fuel injection nozzles 25 and the distance for transferring fuel becomes shorter, the amount of fuel remaining on the inner wall of the working chambers 12f and 12r, especially the amount of unburned fuel remaining in the end zone at the trailing side can be reduced and, as a result, emissions of hydrocarbons can be reduced.

In FIG. 7, the second intake system is omitted for simplicity and the basic arrangements of the rotary piston engine are similar to those of the previous embodiment as shown in FIG. 1 so that corresponding parts are designated by the same reference numerals as in the previous embodiment.

Figure 8:
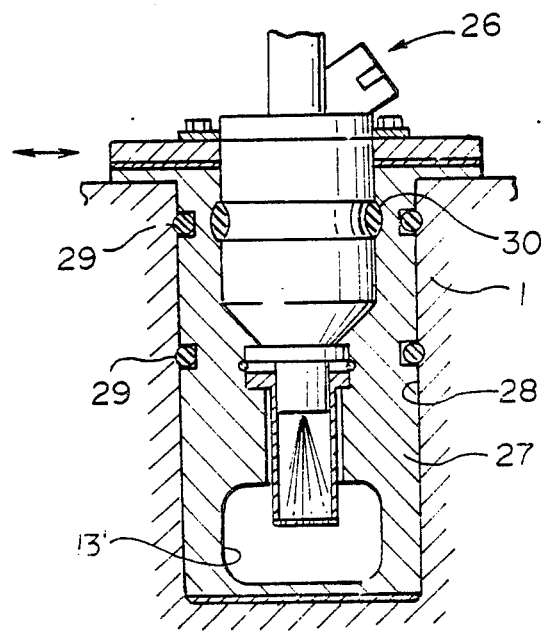
FIG. 8 is a schematic drawing showing the structure of a fuel injection nozzle in the embodiment of the present invention.

FIG. 8 shows a example of the structure of the fuel injection nozzle 26 to be provided within the communicating passage 13.

As shown in FIG. 8, there is provided a block 27 having a hole portion 13' for forming a part of the communicating passage 13 at a lower portion thereof and the fuel injection nozzle 26 is fixed so as to face the hole portion 13' in said block 27. Then, the block 27 is fixed in a cavity 28 provided for the intermediate housing 1. The block 27 and the cavity 28 are sealed by two O-rings 29 and the fuel injection nozzle 26 and the block 27 are sealed by O-ring 30.

As described above, in accordance with the present invention, since the communicating passage is closed so that there remains a larger amount of intake air than the minimum required amount of intake air in the working chamber and the amount of intake air is controlled by the throttle valve, it is possible to obtain a rotary piston engine capable of reducing the pumping loss remarkably and desirably controlling the amount of intake air in accordance with the engine driving condition without controlling the opening of the control valve located within the communicating passage closely and accurately.

The present invention has thus been shown and described with reference to a specific embodiment. However, it should be noted that the present invention is in no way limited to the details of the described arrangements but changes and modifications may be made without departing from the scope of the appended claims.

For example, although, as described in the above embodiment, the present invention is preferably applied to a two-rotor type rotary piston engine, the present invention can be applied to other types of rotary piston engines such as a three-rotor type rotary piston engine.

Further, a rotary valve can be employed for the control valve in place of the butterfly valve.

What is claimed is:

1. An intake system for a rotary piston engine having a plurality of engine sections each having a rotor therein and in each of which a working chamber is formed, said engine sections being separated by an intermediate housing and each engine section having at least one intake port for introducing intake air into each of said working chambers, each of said intake ports communicating with an intake passage means and being located so as to be opened by the respective rotor after a top dead center position of the rotor and closed after a bottom dead center position of the rotor, the respective rotors having a phase difference therebetween, the system comprising communicating passage means for communicating said engine sections so that intake air can be transferred between said engine sections in accordance with the difference in rotor phase between the engine sections, said communicating passage means having openings in the respective sections, the openings being located in the respective sections so as to be opened by the respective rotor a predetermined time after the respective intake port is opened and so as to be closed a predetermined time after the intake port is closed and so as to retain a larger amount of intake air in each of the working chambers than the minimum amount of intake air required for ensuring idling rotation speed under an idling engine operating condition when the communicating passage means is closed, control valve means for opening and closing the communicating passage means, control means for providing a signal based upon engine load and outputting the signal to said control valve means, said control valve means being located in said communicating passage means and operated in accordance with the signal output of the control means so as to open the communicating passage means under at least a light load engine operating condition, and throttle valve means for controlling the amount of intake air, said throttle valve means being located in said intake passage means for control by accelerator pedal means.

2. An intake system in accordance with claim 1 in which said communicating passage means is provided in the intermediate housing.

3. An intake system in accordance with claim 1 in which the opening of said control valve means is controlled in accordance with the engine load so that it is opened under the low load driving condition and is closed under the heavy load driving condition.

4. An intake system in accordance with claim 3 in which said control valve is further controlled by said control means to close the communicating passage means under the idling condition.

5. An intake system in accordance with claim 1 in which the openings of the communicating passage means are formed to fit the shape of the respective rotors and located so as to be opened at a predetermined timing and closed at a predetermined timing by the respective rotors.

6. An intake system for a rotary piston engine having a plurality of engine sections each having a rotor therein and in each of which a working chamber is formed, said engine sections being separated by an intermediate housing and each engine section having at least one intake port for introducing intake air into each of said working chambers, each of said intake ports communicating with an intake passage means and being located so as to be opened by the respective rotor after a top dead center position of the rotor and closed after a bottom dead center position of the rotor, the respective rotors having a phase difference therebetween, the system comprising communicating passage means for communicating said engine sections so that intake air can be transferred between said engine sections in accordance with the difference in rotor phase between the engine sections, said communicating passage means having openings in the respective sections, the openings being located in the respective sections so as to be opened by the respective rotor a predetermined time after the respective intake port is opened and so as to be closed a predetermined time after the intake port is closed and so as to retain a larger amount of intake air in each of the working chambers than the minimum amount of intake air required for ensuring idling rotation speed under an idling engine operating condition when the communicating passage means is closed, control valve means for opening and closing the communicating passage means, control means for providing a signal based upon engine load and outputting the signal to said control valve means, said control valve means being located in said communicating passage means and operated in accordance with the signal output of the control means so as to open the communicating passage means under at least a light load engine operating condition and which further includes fuel feeding means provided in the communicating passage means.

7. An intake system for a two-rotor type rotary piston engine having two engine sections each having a rotor therein and in each of which a working chamber is formed, said engine sections being separated by an intermediate housing and attached with a side housing and each engine section having at least one intake port for introducing intake air into each of said working chambers, each of said intake ports communicating with intake passage means, and being located so as to be opened by the respective rotor after a top dead center position of the rotor and closed after a bottom dead center position of the rotor, the respective rotors having a phase difference therebetween, the system comprising communicating passage means for communicating said engine section so that intake air can be transferred between said engine sections in accordance with the rotor phase difference between the engine sections, said communicating passage means having openings in the respective sections, the openings being provided in said intermediate housing, the openings being located so that each opening is closed with the same time delay after the intake port in each of the engine sections is closed and so as to retain a larger amount of intake air in the each working chamber than the minimum amount of intake air required for ensuring idling rotation speed under an idling engine operating condition when the communicating passage means is closed, control valve means for opening and closing the communicating passage means, control means for providing a signal based upon engine load and outputting the signal to said control valve means, said control valve means being located in said communicating passage means and operated in accordance with the signal output of the control means so as to open the communicating passage means under at least a light load engine operating condition, and throttle valve means for controlling the amount of intake air, said throttle valve means being located in said intake passage means for control by accelerator pedal means.

8. An intake system in accordance with claim 7 in which a first intake port and a second intake port are provided in each engine section, said first intake ports being formed on opposite faces of the intermediate housing, said second intake ports being formed on an inner wall of the respective side housing and located so as to be closed under the low load driving condition.

9. An intake system in accordance with claim 7 in which the openings of said communicating passage means are located so as to be closed by the respective rotors from the time the respective intake ports are closed to the top dead center positions in the compression strokes of the respective engine sections.

10. An intake system in accordance with claim 7 in which the openings of said communicating passage means are located so as to be closed by the respective rotors from the time the respective intake ports are closed to the time the respective eccentric shaft angle is about 135 degrees from the bottom dead center position in the respective engine section.

11. An intake system in accordance with claim 7 in which the respective intake ports are located so as to be opened from the time the respective eccentric angle is about 32 degrees after top dead center to the time the eccentric angle is about 40 degrees after bottom dead center and in which the respective openings of the communicating passage means are opened from the time the respective eccentric angle is about 75 degrees after top dead center to the time the eccentric angle is about 135 degrees after bottom dead center.

12. An intake system in accordance with claim 7 in which the respective ports are located so as to be opened from the time the respective eccentric angle is 32 degrees after top dead center to the time the eccentric angle is 40 degrees after bottom dead center and in which the respective openings of the communicating passage means are opened from the time the respective eccentric angle is 75 degrees after top dead center to the time the eccentric angle is 135 degrees after bottom dead center.

* * * * *